United States Patent [19]

Donahue et al.

[11] Patent Number: 5,392,560
[45] Date of Patent: Feb. 28, 1995

[54] INSECT TRAP

[75] Inventors: J. Paul Donahue, Palo Alto; John Zolkos, Union City, both of Calif.

[73] Assignee: J. Paul Donahue DBA Donahue International, Mountain View, Calif.

[21] Appl. No.: 231,960

[22] Filed: Apr. 21, 1994

Related U.S. Application Data

[63] Continuation of Ser. No. 841,033, Feb. 25, 1992, now abandonded.

[51] Int. Cl.⁶ .............................................. A01M 1/02
[52] U.S. Cl. ..................................... 43/122; 43/118; 43/107
[58] Field of Search ........................ 43/107, 118, 122

[56] References Cited

U.S. PATENT DOCUMENTS

| | | | |
|---|---|---|---|
| 1,333,470 | 3/1920 | Curran | 43/107 |
| 1,410,298 | 3/1922 | Harned | 43/118 |
| 1,703,322 | 2/1929 | Rummel | 43/118 |
| 1,865,713 | 7/1932 | Taylor | 43/107 |
| 2,478,104 | 8/1949 | Johnson | 43/122 |
| 4,244,135 | 1/1981 | Harwoods | 43/122 |
| 5,231,791 | 8/1993 | Falkson | 43/107 |

FOREIGN PATENT DOCUMENTS 159318  8/1904  Germany ............................ 43/122

OTHER PUBLICATIONS

Four photographs (each marked on the back "Ref AR for Ser. No. 07/841,039, Filed Feb. 25, 1992").

Primary Examiner—Kurt Rowan
Attorney, Agent, or Firm—Christie, Parker & Hale

[57] ABSTRACT

A simple three-piece insect trap for attracting and capturing flying insects consists of a hollow, opaque bait container having a neck with openings for admitting flies and a body for holding insect bait, a cone section mounted on the bait container neck for directing insects upward, and a transparent top cover mounted around the cone section for trapping the insects. The upper wall of the bait container body extends inwardly toward the neck of the bait container to form a shelf on which flying insects can land when attracted by volatile constituents which emanate from bait within the body. Moreover, an outwardly opening annular cavity is formed between the shelf on the bait container and the lower wall of the cone section, each of which are opaque to encourage flies to enter the neck through the apertures. When insects enter the aperture, they are discouraged by darkness from flying toward the bait in the opaque bait container. Conversely, the cone section is open at its top to admit light and to permit insects to pass from the cone to the cover, where they remain trapped.

22 Claims, 4 Drawing Sheets

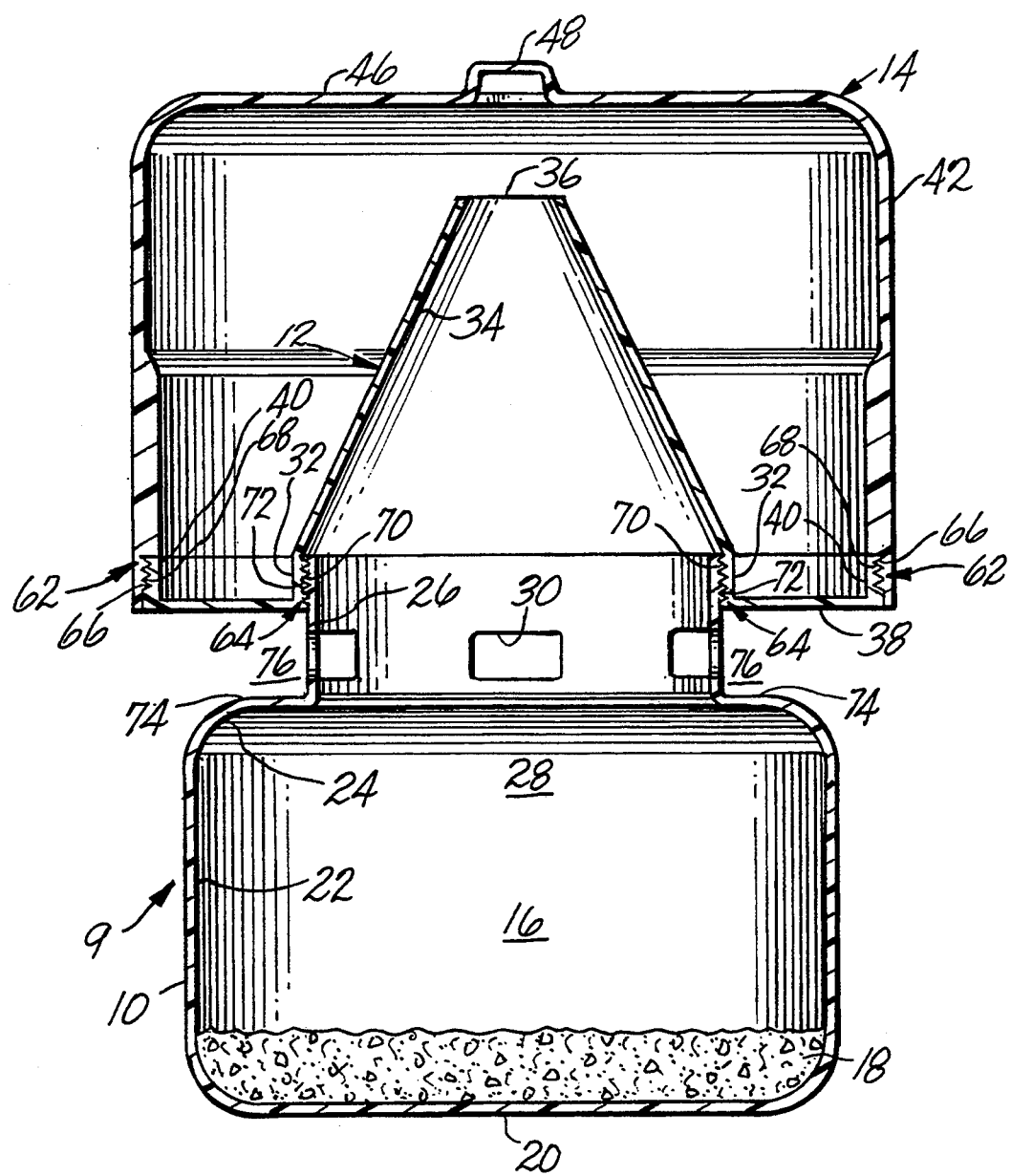

5,392,560

INSECT TRAP

FIELD OF THE INVENTION

This invention relates to traps for flying insects, such as flies and the like.

This application is a continuation of design patent application Ser. No. 07/841,033, filed Feb. 25, 1992, now abandoned.

BACKGROUND OF THE INVENTION

For many years, various traps for flying insects, such as flies, have been presented to the public. However, those prior art traps are relatively complicated structures which are difficult to manufacture inexpensively. Examples of such traps are shown in U.S. Pat. No. 920,696, issued May 4, 1909, to Turner; and U.S. Pat. No. 4,551,941, issued Nov. 12, 1985, to Schneidmiller. Although U.S. Pat. No. 4,360,987, issued Nov. 30, 1982, to Lowder shows a trap which is relatively easy to manufacture, this trap has a restricted use for capturing relatively small insects which cannot crawl, such as gnats.

SUMMARY OF THE INVENTION

This invention provides a simple three-piece insect trap which can be easily and inexpensively manufactured by well-known plastic molding techniques.

The preferred form of this invention includes a hollow bait container for admitting flies and holding insect bait, a cone section on the bait container for directing flies upward, and a transparent top cover around the cone section for trapping and holding the flies. The bait container includes an opening surrounded by a neck extending away from, and formed integrally with, a body of the bait container. The neck has at least one aperture extending through it to admit flying insects.

The cone section is open at its top to admit light and to permit insects to pass from the cone to the cover. The cone has an inner annular rim which makes a close fit with the neck and is integrally formed with the base portion of a hollow truncated cone which tapers inwardly away from the inner annular rim. An outwardly extending annular flange is also formed integrally with the inner annular rim, and an outer annular rim is formed integrally with an outer portion of the flange.

The cover includes an annular sidewall having an edge which makes a close fit with the outer annular rim. The cover also includes a top wall formed integrally with the sidewall.

In a presently preferred embodiment of the invention, the body of the bait container extends inwardly toward the neck of the bait container to form a shelf on which flying insects can land when attracted by volatile constituents which emanate from bait within the body of the bait container and pass to the atmosphere through the aperture in the neck formed integrally with the body. Preferably, the neck includes a plurality of apertures, say, three or four, spaced at equal intervals around the neck. The cover flange overlies the shelf so that an outwardly opening annular cavity is formed between the flange and shelf, each of which are dark and opaque to encourage flies to enter the neck through the apertures and then fly up into the cone away from the apertures.

The preferred form of the invention also includes cam or screw locking means for securing the neck of the bait container to the inner annular rim of the cone section, and similar means for securing the outer annular rim of the cone section to a sidewall of the cover.

Preferably, the body is opaque and the cone is translucent to transparent. The cover is of a material which transmits light at least as well that of the cone.

BRIEF DESCRIPTION OF THE DRAWINGS

FIG. 5 is a sectional elevational view of an alternate embodiment of the trap shown in FIG. 1.

DETAILED DESCRIPTION

Figure 1:
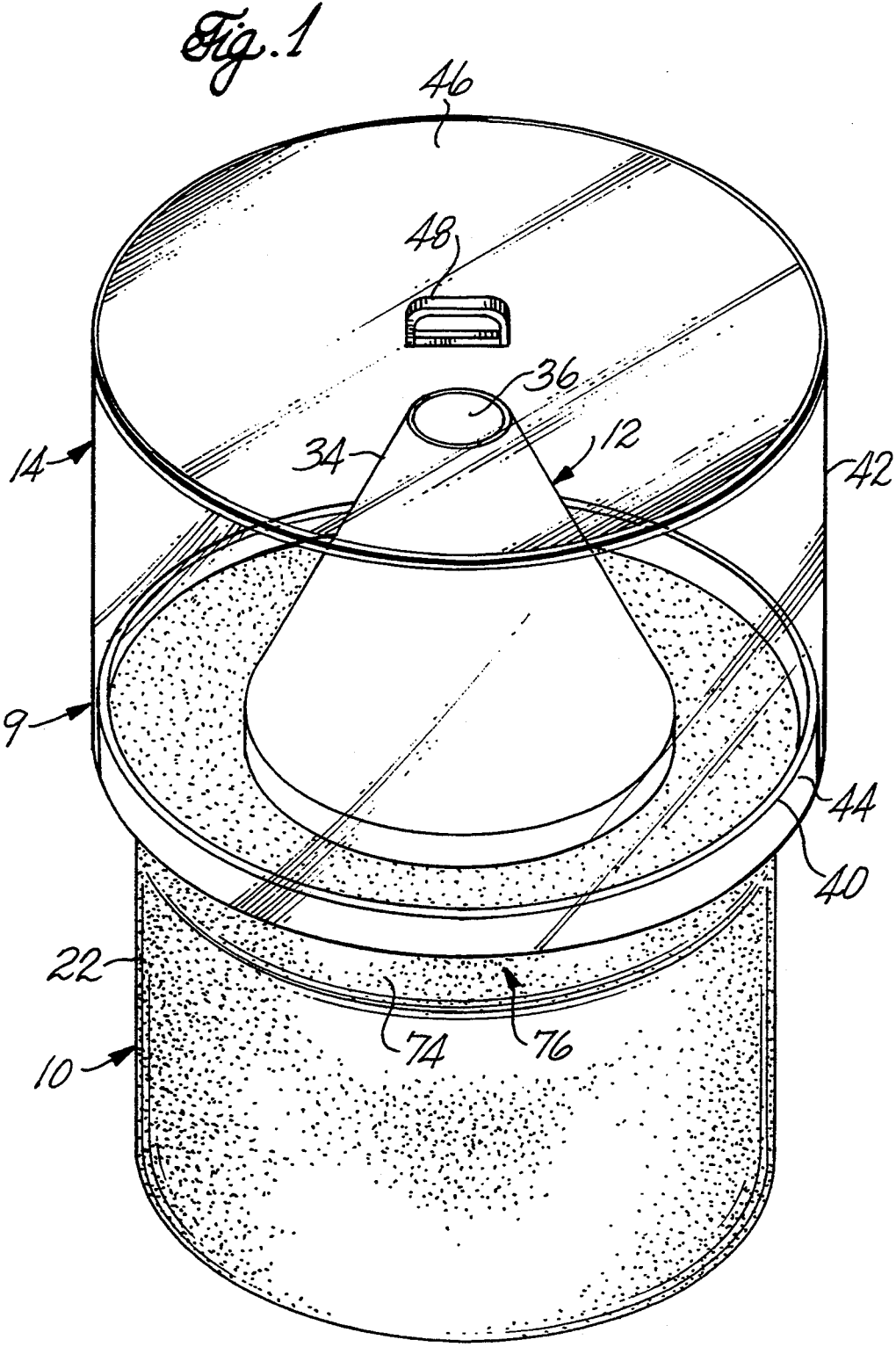
FIG. 1 is a perspective view of the insect trap according to the presently preferred embodiment of the invention.
Figure 2:
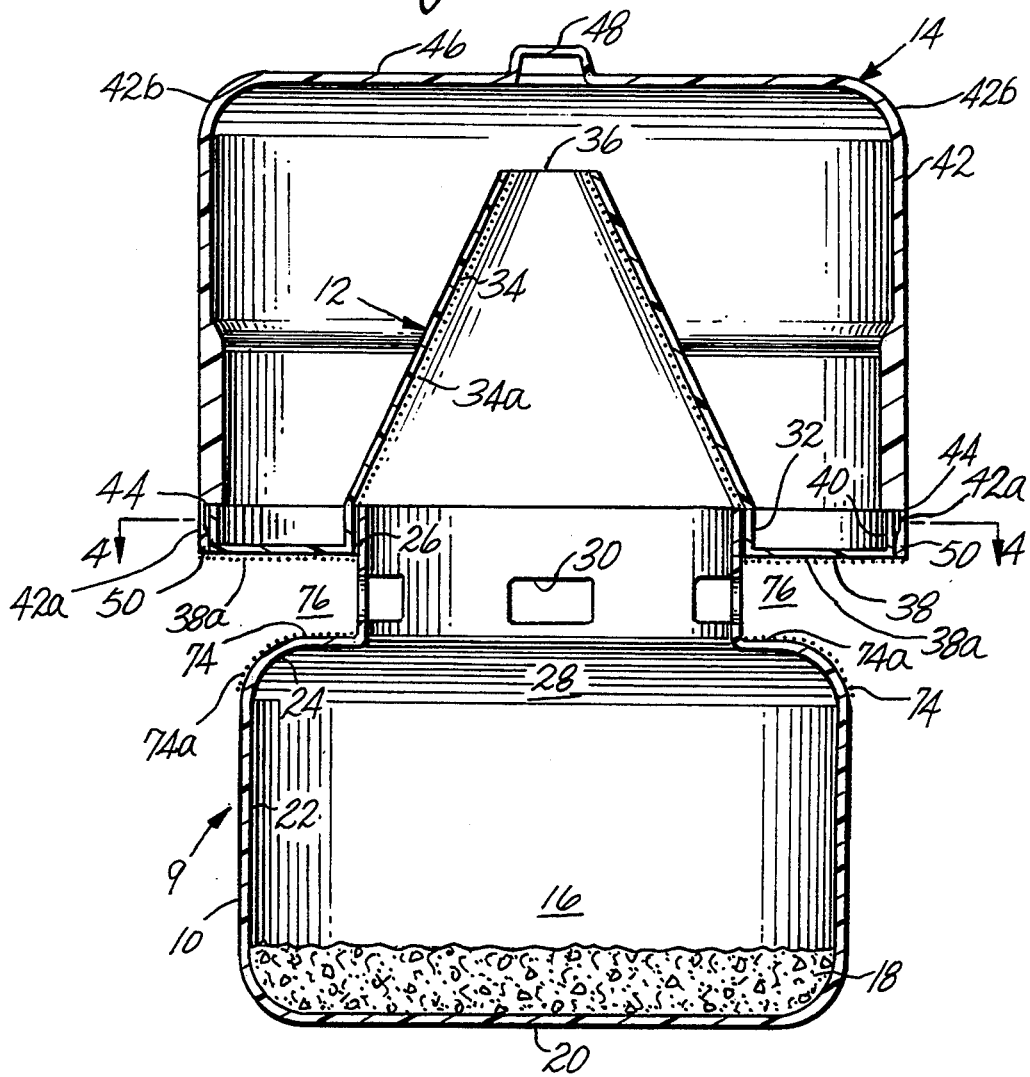
FIG. 2 is a sectional elevation of the trap shown in FIG. 1.

Referring to FIGS. 1 and 2, a trap 9 includes a bait container 10, a cone section 12, and a cover 14. The bait container includes a hollow body 16 for holding insect bait 18 having a circular bottom wall 20, a cylindrical sidewall 22 formed integrally at its lower edge with the outer periphery of the bottom wall, and an inwardly extending, annular top wall 24 formed at its lower portion integrally with the upper edge of the sidewall. The inner periphery of the top wall is formed integrally with the lower edge of a cylindrical neck 26, which surrounds an opening 28 leading into the body. Four equally-spaced apertures 30 extend through the neck.

The cone section 12 includes an inner annular rim 32 which makes a snug fit around the upper end of the neck. An upwardly and inwardly extending hollow truncated cone 34 is formed integrally at its base 85 with the upper edge of the inner annular rim. The apex 36 of the cone is open to permit passage of light and insects.

The inner edge of an annular flange 38 is formed integrally with the bottom edge of the inner annular rim 32. The outer edge of flange 38 is formed integrally with the lower edge of an upwardly extending outer annular rim 40, which makes a snug fit in the lower edge of an annular sidewall 42 of a cover 14. The upper edge of the outer annular rim abuts against a downwardly facing annular shoulder 44 formed in the inside of the lower edge of the annular sidewall.

The cover 14 includes a top wall 46 formed integrally at its periphery with the upper edge 42a of the annular sidewall. The cover, preferably transparent to light, prevents insects from escaping once the insects fly up and out of the hollow cone. A loop 48, formed integrally with the outer surface of the central portion of the top wall, provides a convenient means for hanging the trap.

Figure 3:
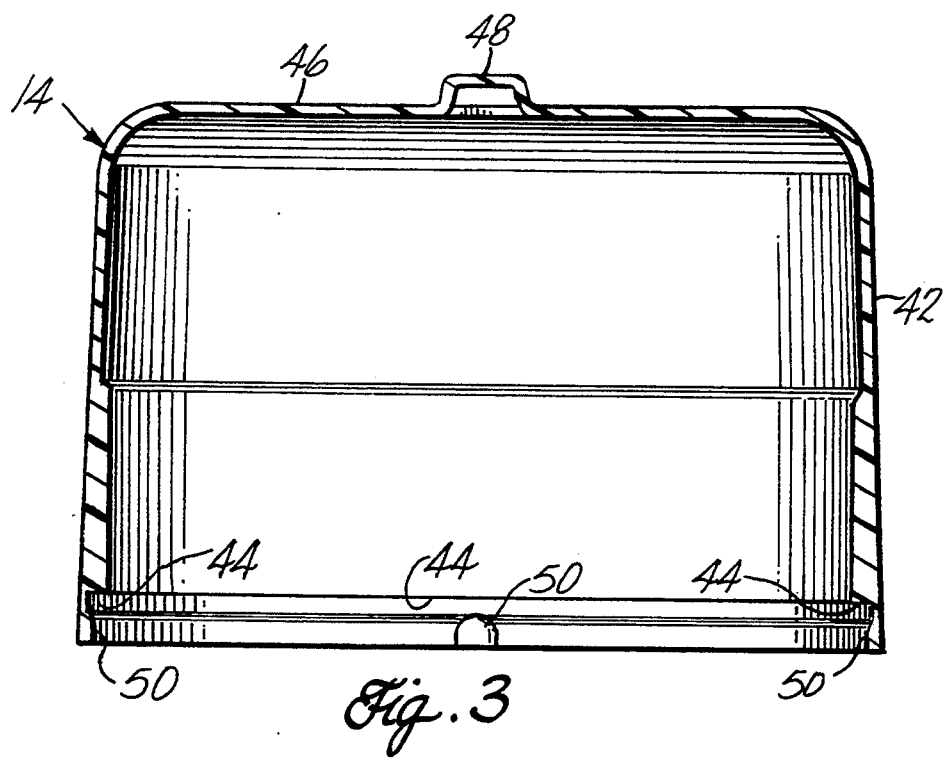
FIG. 3 is a sectional elevation of the cover removed from the trap.
Figure 4:
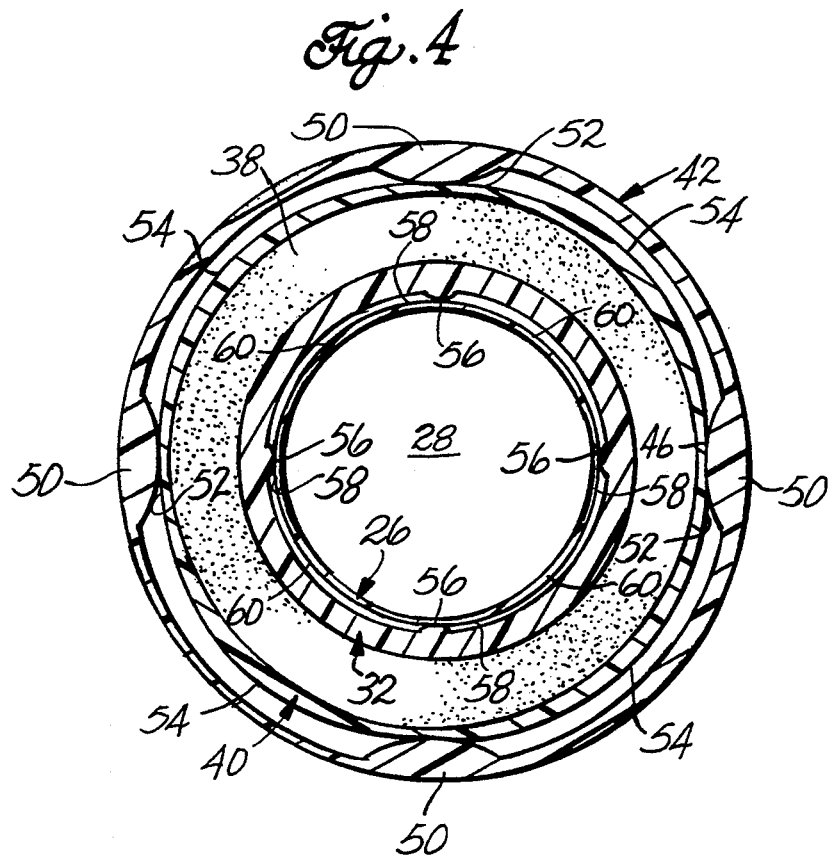
FIG. 4 is a view taken on line 4—4 of FIG. 2.

Referring to FIGS. 3 and 4, a portion of the annular sidewall 42 adjacent the outer annular rim 40 includes four vertically and inwardly extending cam lobes 50 spaced at equal intervals around the lower portion of the annular sidewall. The exterior surface of the outer annular rim includes four equally spaced vertical and inwardly opening recesses 52 so that a separate respective cam lobe can fit into a respective recess space to facilitate assembly of the cover to the position shown in FIG. 1. The cover is locked in place by rotating it about 90° from the position shown in FIG. 4 so that each cam lobe 50 is opposite a respective thickened portion 54 in the outer annular rim thereby forming a lock assembly.

Since the annular sidewall of the cover and the outer annular rim are made of plastic, they are somewhat flexible, thus permitting the rim and sidewall to make a snug friction fit.

As shown in FIG. 4, the inner surface of the inner annular rim 32 includes four vertical and inwardly extending cam lobes 56 spaced at equal intervals around the annular rim. Each cam lobe fits into a respective recess 58 in the outer surface of the neck 26 to form cam lock assemblies so that the inner annular rim and neck can be assembled and locked together by rotating the bait container 90° so that each cam lobe engages a respective thickened portion 60 of the neck, as shown in FIG. 2, and as just described with respect to the cover sidewall and the outer annular rim.

In an alternate embodiment of the trap 9, as shown in FIG. 5, the cover 14 may be coupled to the cone section 12, and the bait container 10 may be coupled to the cone section with respective screw lock assemblies 62, 64 thereby forming lock assemblies. To couple the cover to the cone section, the cover annular sidewall 42 and the outer annular rim 40 can be provided with complementary mating threads 66, 68. Similarly, to couple the bait container to the cone section, the upper portion of the neck 26 and the inner annular rim 32 can be provided with complementary mating threads 70, 72.

Each of the three separate elements of the trap of this invention can easily be molded from any suitable plastic using well-known, conventional molding techniques such as blow-molding or injection molding. We prefer to use high-density polyethylene for the cover because it is clear and transmits the maximum amount of light. The cone section can be made of styrene and can be either clear, translucent, or even opaque. Preferably, the bait container is made of high-density polyethylene or polypropylene which includes a pigment to make the body opaque.

The operation of the trap takes advantage of the instincts of most flying insects to fly toward bright light. The trap is used by assembling it to the position shown in FIG. 1 (see also FIG. 2 or FIG. 5), the bait 18 having previously been placed in the bait container body 16 before complete assembly of the trap. Volatile components from the bait diffuse through the apertures 30 in the bait container neck and attract insects which can land on an annular shelf or landing pad 74 formed by the external surface of the top wall 24 of the bait container body, or fly directly through the apertures.

To further facilitate entry by flies into the apertures, a preferably opaque, outwardly opening annular cavity 76 formed between the annular flange 38 and the shelf 74 directs flies toward the light from the apertures and physically guides the insects toward the apertures. The flange and shelf are preferably black for maximum effectiveness in guiding flies into the trap. Moreover, the flange and shelf are preferably textured as at 38a and 74a, respectively to provide slightly rough surfaces on which the flying insects can crawl toward the apertures.

Once inside the apertures within the neck of the trap, the insect will be drawn upward toward the light transmitted through the transparent cover 14 and translucent cone 34. Conversely, the insects will be discouraged from returning to the dark annular cavity, and from attempting to reach the bait within the dark and opaque bait container body.

To further encourage the insect to travel up and out the apex 36 of the cone, the interior wall of the cone is preferably textured as at 34a and translucent. The textured cone allows the insect to crawl on the cone. The translucent cone also transmits less light than the open apex, and, therefore, the insect will be drawn toward the more brightly lighted apex and into the space between the cone and the cover.

Once in the space between the cone section and the cover, the insects will remain trapped and eventually die. Although the probability is low that the trapped insects will escape back through the open apex, the exterior wall of the cone is preferably smooth to prevent the trapped insects from being able to crawl toward the apex. To facilitate disposal of the dead insects within the trap, the cover is readily detachable from the cone section.

In an alternate embodiment, the cover 14 may be integrally connected to the cone section 12 providing a disposable entrapment chamber. In such an embodiment, the chamber could readily be disposed of and replaced when filled of dead insects. No cleaning would be required.

The described invention is indicative of preferred embodiments of an insect trap. Various and numerous changes may be made without departing from the scope of the invention. For example, the trap may be constructed in various shapes and sizes or of different materials suited for various environments. Also, the opaque color of the bait container and the size of the apertures around the neck of the bait container may be varied to attract and admit different types of flying insects into the trap.

We claim:

1. An insect trap comprising a bait container and an entrapment chamber, the bait container comprising a hollow body for holding bait, the body including a bottom wall, an upright side wall with an upper edge and a lower edge, the lower edge of the side wall being secured to the bottom wall around the periphery of the bottom wall, a shelf having an outer periphery secured to the upper edge of the sidewall and extending inwardly to terminate at an inner periphery which defines an opening into the body, and an upright neck having an upper periphery and a lower periphery secured to the inner periphery of the shelf, the neck having at least one aperture extending through it;

the entrapment chamber comprising a rim which makes a close fit with the neck, an upwardly and inwardly extending hollow truncated cone having an open apex and a base secured to the rim, an outwardly extending annular flange secured at its inner periphery to the rim, an annular sidewall having lower and upper edges, the lower edge of the sidewall being secured to the outer periphery of the flange, and a top wall secured to the upper edge of the sidewall, the flange being spaced above the shelf to form with the shelf an outwardly opening channel around the exterior of the neck.

2. The insect trap of claim 1 in which the bait container is opaque.

3. The insect trap of claim 1 in which the hollow truncated cone comprises a light diffuser.

4. The insect trap of claim 1 in which at least the top wall of the entrapment chamber is transparent.

5. The insect trap of claim 1 in which the annular flange of the entrapment chamber is opaque, and the shelf of the bait container is opaque forming a darkened cavity externally adjacent the aperture in the neck.

6. The insect trap of claim 1 in which the rim of the entrapment chamber attaches to the neck of the bait container above the aperture by a car lock assembly.

7. The insect trap of claim 1 in which lower edge of the annular sidewall of the entrapment chamber detachably couples to an outer edge of the annular flange by a lock assembly.

8. The insect trap of claim 1 in which the hollow truncated cone is translucent to encourage flying insects toward the open apex.

9. The insect trap of claim 1 further comprising a means for disposing insects trapped within the entrapment chamber, including a detachable lock assembly between the entrapment chamber and the ba it container.

10. The insect trap of claim 1 in which the annular flange has an outer diameter greater than the outer diameter of the shelf.

11. The insect trap of claim 1 in which the shelf and annular flange are textured to allow flying insects to crawl toward the aperture.

12. The insect trap of claim 1 in which the neck has a plurality of apertures extending through it.

13. The insect trap of claim 1 in which the rim of the entrapment chamber attaches to the neck of the bait container above the aperture by a screw lock assembly.

14. The insect trap of claim 1 in which the sidewall of the entrapment chamber detachably couples to the flange by a cam lock assembly.

15. The insect trap of claim 1 in which the annular sidewall of the entrapment chamber detachably couples to the outer periphery of the flange by a screw lock assembly.

16. The insect trap of claim 1 in which the hollow truncated cone has a textured interior wall to allow flying insects to crawl toward the open apex.

17. The insect trap of claim 1 in which the hollow truncated cone has a smooth exterior wall to prevent flying insects from crawling toward the open apex.

18. The insect trap of claim 1 further comprising a means for disposing insects trapped within the top cover, including a detachable lock assembly between the cover and the cone.

19. The insect trap of claim 1 further comprising a hollow loop formed on the top wall for hanging the trap.

20. The insect trap of claim 1 in which the top wall transmits light at least as well as the hollow truncated cone.

21. The insect trap of claim 1 in which the lower edge of the entrapment chamber is releasably secured to the outer periphery of the flange, and the exterior dimensions of the body are such that the body will nest inside the sidewall when it is disconnected from the flange to provide a compact package for shipping.

22. An insect trap according to claim 21 in which the apex of the cone is smaller than the opening through the neck of the body so the cone can be nested at least partially within the body to provide a compact package for shipping.

* * * * *

UNITED STATES PATENT AND TRADEMARK OFFICE
CERTIFICATE OF CORRECTION

PATENT NO. : 5,392,560

DATED : February 28, 1995

INVENTOR(S) : J. Paul Donahue; John Zolkos

Page 1 of 2

It is certified that error appears in the above-indentified patent and that said Letters Patent is hereby corrected as shown below:

On the Title Page, Item 63, change "Ser. No. 841,033" to -- Ser. No. 841,039 --.

Column 1, line 3, between the title and "FIELD OF THE INVENTION" insert
-- CROSS REFERENCE TO RELATED APPLICATION
This is a continuation of application Serial No. 07/841,039, filed February 25, 1992, now abandoned. --.

Column 2, line 36, change "base 85" to -- base 35 --.
Column 2, line 42, after "lower edge" insert -- 42a --.
Column 2, line 49, change "upper edge 42a" to -- upper edge 42 --.

Column 4, line 19, change "filled of" to -- filled with --.

Column 5, line 3, change "car" to -- cam --.
Column 5, line 4, after "which" insert -- the --.
Column 5, line 14, change "ba it" to -- bait --.

UNITED STATES PATENT AND TRADEMARK OFFICE
CERTIFICATE OF CORRECTION

PATENT NO.  : 5,392,560
DATED       : February 28, 1995
INVENTOR(S) : J. Paul Donahue; John Zolkos It is certified that error appears in the above-indentified patent and that said Letters Patent is hereby corrected as shown below:

Column 6, line 20, before "entrapment" insert
          -- sidewall of the --.
Column 6, line 24, after "sidewall" insert
          -- of the entrapment chamber --.

Signed and Sealed this

Fourth Day of June, 1996

Attest:

BRUCE LEHMAN

Attesting Officer

Commissioner of Patents and Trademarks